United States Patent [19]

Denny

[11] 3,967,172

[45] June 29, 1976

[54] CONTROL CIRCUIT, REFRIGERATION SYSTEM, AND METHOD OF CONTROLLING SPEED OF AN ALTERNATING CURRENT MOTOR

[75] Inventor: Dann W. Denny, Morrison, Ill.

[73] Assignee: General Electric Company, Fort Wayne, Ind.

[22] Filed: Feb. 10, 1975

[21] Appl. No.: 548,765

[52] U.S. Cl. .............................. 318/227; 318/225 R; 62/184; 62/186
[51] Int. Cl.² ........................................... H02P 5/40
[58] Field of Search ............................ 62/184, 186; 236/DIG. 9; 318/220 R, 225 R, 227, 229

[56] References Cited
UNITED STATES PATENTS

| | | | |
|---|---|---|---|
| 3,415,071 | 12/1968 | Kompelien | 62/184 |
| 3,568,019 | 3/1971 | Hirokawa et al. | 318/227 X |
| 3,613,391 | 10/1971 | Harter | 318/227 X |
| 3,792,324 | 2/1974 | Suarez et al. | 318/227 X |

*Primary Examiner*—Gene Z. Rubinson
*Attorney, Agent, or Firm*—Joseph E. Papin

[57] ABSTRACT

A control circuit for varying the speed of a dynamoelectric machine having a plurality of windings selectively energizable in different configurations for operation of the dynamoelectric machine at different speeds from an alternating current source. The control circuit has a phase control circuit for providing signals having a controllable phase relation to the alternating current source. A gate controlled full wave alternating current switch is connected in parallel with one of the windings, and the parallel combination of the one winding and the switch is connected in series with at least another of the windings whereby the switch conducts generally the full alternating current source voltage applied to the other winding. Means couples the phase control circuit to the gate of the switch to control the start of the conduction of the switch.

A control circuit in a refrigeration system and a method of controlling speed of a dynamoelectric machine are also disclosed.

14 Claims, 5 Drawing Figures

CONTROL CIRCUIT, REFRIGERATION SYSTEM, AND METHOD OF CONTROLLING SPEED OF AN ALTERNATING CURRENT MOTOR

BACKGROUND OF THE INVENTION

This invention relates generally to control circuits and in particular to a control circuit for varying the speed of an alternating current motor, a refrigeration system utilizing such control circuit, and a method of controlling speed of an alternating current motor.

In the past, many and various types of control circuits have been utilized for varying the speed of a dynamoelectric machine, such as an electric motor. For instance, it is well known in the art to provide a fan driven by an electric motor in a refrigeration system to aid in cooling a condenser coil thereof, and it has been recognized that the efficiency of the refrigeration system may be impared and other problems created if the temperature of the condenser varies generally from a preferred operating range. Further, various systems for sensing condenser temperature and controlling fan motor speed have been utilized in the past to control the condenser temperature, and one related system is disclosed in my copending application Ser. No. 548,764 filed Feb. 10, 1975.

SUMMARY OF THE INVENTION

Among the several objects of the present invention may be noted the provision of a control circuit for varying speed of an alternating current motor, a refrigeration system utilizing such control circuit, and a method of controlling speed of an alternating current motor which overcome the problems discussed hereinabove, as well as others, with respect to the prior art; the provision of such control circuit, system and controlling method in which the alternating current motor or dynamoelectric machine is never subjected to more than a fraction of a line voltage applied thereto thereby to permit the use of reduced voltage rating circuit components which, of course, is more economical; the provision of such control circuit, system and controlling method for the dynamoelectric machine having multiple operating speeds depending upon the manner in which the windings of the dynamoelectric machine are interconnected; the provisions in such system of improved regulation for a selected temperature range of a condenser of such system and therefor also for the head pressure thereof; and the provision of such control circuit, system and controlling method which are simplistic in nature and therefore economical. Other objects and advantageous features of the present invention will be in part apparent and in part pointed out hereinafter.

In general, a control circuit in one form of the invention is provided for controlling the speed of an alternating current motor having a plurality of windings adapted to be energized in different combinations. The control circuit has a pair of gate controlled full wave alternating current switches. One of the switches is coupled in series relation with a pair of the windings and is adapted when conductive to effect energization of the motor in one operating speed mode thereof. The other of the switches is coupled in parallel relation with the one switch and the one winding, and the other switch is conductive upon the occurrence of preselected conditions for shorting the one switch and the one winding of the winding pair thereby to effect energization of the motor in another operating speed mode thereof.

Also in general and in one form of the invention, a control circuit is provided for varying the speed of an electric motor having a plurality of windings selectively energizable in different configurations for effecting operation of the motor at different speeds from an alternating current source. In this control circuit, a phase control circuit is responsive to the alternating current for providing signals having a controllable phase relationship to the alternating current source. A first gate controlled full wave alternating current switch is connected in parallel with one winding, and the parallel combination of the one motor winding and the switch is coupled in series with other motor windings whereby when the first switch is conducting generally the full alternating current source voltage is applied to the other motor windings. Means is provided for coupling the phase control circuit to the gate of the first switch to control the start of conduction of the first switch.

Further in general, a refrigeration system in one form of the invention has a compressor, a condenser, an evaporator, and a fan for forcing air past the condenser to cool it and aid in condensing refrigerant therein. In this system, there is provided a control circuit for controlling the speed of the fan thereby to regulate condenser temperature, and the control circuit has an alternating current motor for driving the fan with a plurality of windings selectively energizable in different configurations for operating the motor at corresponding different speeds. A phase control circuit has a condenser temperature responsive means for providing temperature indicative control signals, and rectifier means provides the phase control circuit with a pulsating direct current. A gate controlled full wave alternating current switch means is coupled in parallel with one of the windings to effectively by pass that winding when the switch means is conducting in either direction, and means is provided for coupling the phase control circuit to the switch means gate to control the duration of switch means conduction inversely with respect to the condenser temperature.

Still further and in general, a method in one form of the invention is provided for controlling the speed of an alternating current motor. In this controlling method, a pair of gate controlled full-wave alternating current switches are coupled respectively in series and parallel relation with one of a plurality of windings of the motor and also couple at least another winding thereof in series relation with one of the switches and the one winding. The duration of conduction of the one switch is controlled in response to the occurrence of predetermined conditions, and the other of the switches is thereby rendered respectively conductive and nonconductive when the one switch is respectively conductive and nonconductive.

In an exemplification of the invention in one form thereof, a condenser coil fan motor, such as for example a permanent split phase capacitor type, has an autotransformer winding, a start winding and capacitor connected in series, and a run winding is connected in parallel with the series start winding and capacitor combination. A gate controlled full wave alternating current switch is provided in parallel with the autotransformer winding for selectively by-passing that winding and operating the motor at a first speed when the switch is conducting. The motor is also operated at a second speed when the switch is nonconducting and a continuously determinable speeds when the switch is conducting for only a portion of an alternating current source cycle. The gate controlled switch is in turn controlled by a phase control circuit which is energized by way of a bridge rectifier circuit coupled across the autotransformer winding so that the bridge rectifier circuit and phase control circuit components are never subjected to more than a fraction of the line voltage and the bridge circuit carries only the relatively low phase control circuit currents thus reducing the cost of the components employed in the control circuit. The phase control circuit provides signals to the switch having a phase relationship to the alternating current source as determined by a thermistor which senses the condenser coil temperature.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner within the scope of the invention.

DESCRIPTION OF THE PREFERRED EMBODIMENT

Figure 1:
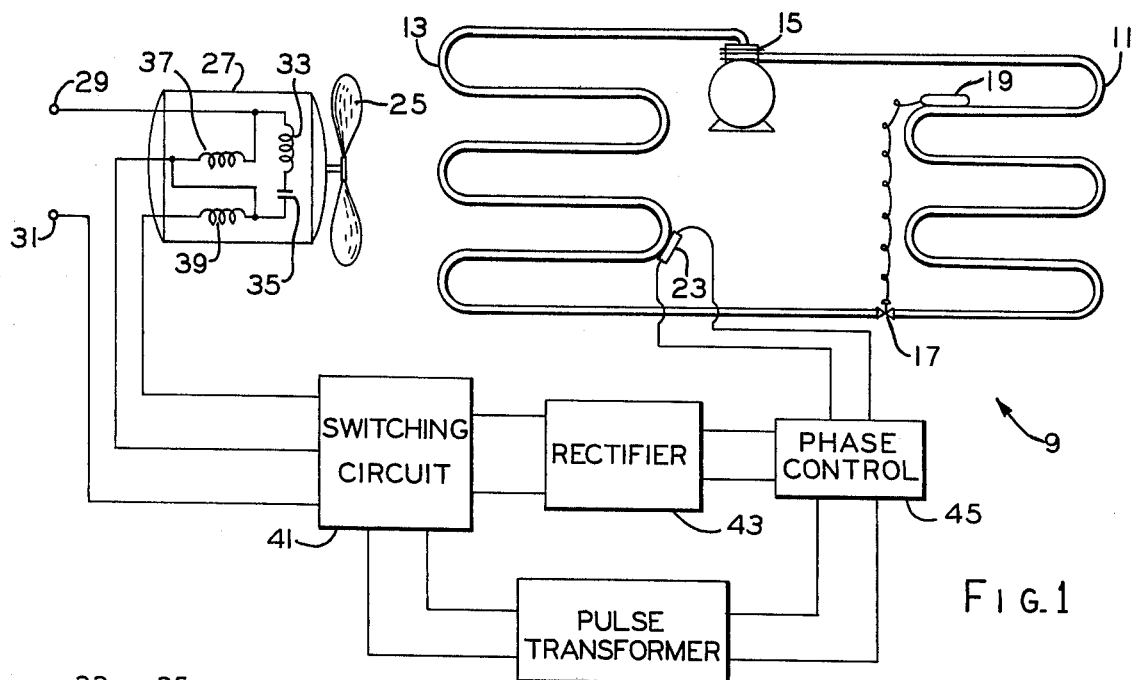
FIG. 1 is a schematic representation of a refrigeration system in one form of the invention.

Referring now to the drawings in greater detail, there is shown in FIG. 1 a referigeration system 9 in one form of the invention having an evaporator coil 11 and a condenser coil 13 interconnected by a compressor 15 and an expansion valve 17. A temperature sensing device 19 may be provided to control the flow of refrigerant through the expansion valve 17 according to the temperature of the evaporator coil 11 in accordance with well-known prior art techniques. A condenser temperature sensing device, such for example as a heat sensitive resistor or a thermistor 23, is disposed on the condensor coil 13 so that the resistance of the resistor 23 reflects the condenser coil temperature and the temperature of the downstream air from the condenser coil.

Figure 2:
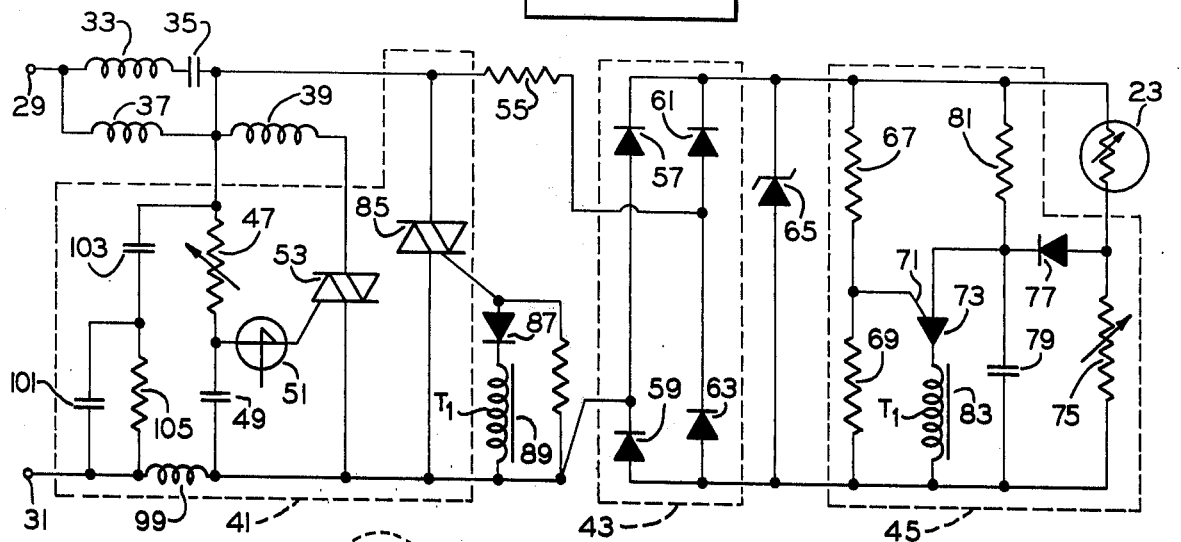
FIG. 2 is a schematic diagram showing in detail electrical components of the system of FIG. 1 and also illustrating a control circuit in one form of the invention for controlling speed of an electric motor as well as teaching principles of a method, also in one form of the invention, for controlling speed of an electric motor.

A fan 25 driven by an electric or alternating current motor 27 forces air past condenser coil 13 and receives its energization from an alternating current source at line terminals 29, 31. Motor 27 may, for example, be a permanent split-phase capacitor type having a start winding 33, a capacitor 35 in series therewith, and a running winding 37 connected in parallel with the series combination of the start winding and the capacitor. Further, an autotransformer winding 39 is also provided in the motor 27 so that it will run at a low speed when the autotransformer winding is connected in series with the start and run windings 33, 37 and at a higher speed when the autotransformer winding is bypassed and only the start and run windings are connected across the line at terminals 29, 31. The remaining circuitry or control circuit depicted in FIGS. 1 and 2 in one form of the invention may be employed to switch motor 27 between its high and low speed connections so as to achieve continuously variable speeds between those two operating speeds. Considering FIGS. 1 and 2 together, a switching circuit 41, a rectifier 43 and a phase control unit or circuit 45 are indicated in corresponding dotted lines on FIG. 2.

In operation, line terminals 29, 31 may be connected across a source of alternating current, such as a standard 230 volt AC source, and current may flow through start and run windings 33, 37 thus providing by way of a variable resistor 47 a charge on a capacitor 49. Resistor 47 and capacitor 49 form a circuit, and very shortly after the beginning of each half cycle of the alternating current, the charge on capacitor 49 will accumulate to a level sufficient to cause a silicon unilateral switch 51 to conduct. When switch 51 is conductive, an enabling signal is thereby provided to a gate controlled full-wave alternating current switch or triac 53 turning switch 53 on and allowing motor 27 to run with autotransformer winding 39 in series with main or run winding 37. Start winding 33 and capacitor 35 may or may not remain in the circuit depending upon the particular type motor selected. Under conditions of relatively low condenser temperature, motor 27 will continue to be operated with run and autotransformer windings 37, 39 in series and with a fraction of the line voltage appearing across the autotransformer winding and therefore also by way of a current limiting resistor 55 across the input to rectifier 43.

Figure 3A:
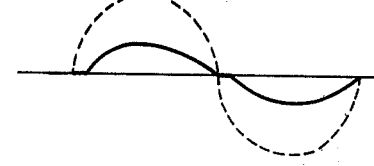
FIGS. 3a, 3b and 3c illustrate exemplary current and voltage wave forms which may be achieved in the system and circuits of FIGS. 1 and 2.

Rectifier 43 may be implemented as a simple diode bridge circuit employing a plurality of diodes 57, 59, 61, 63 and providing at its output terminals a pulsating direct current. A zener diode 65 may be provided across the output of rectifier 43 to limit the peak values of the pulsating direct current to a preferred value thus providing a voltage regulated power source for phase control unit 45. At the beginning of either positive or negative excursions of the line voltage, the voltage across zener diode 65 begins a positive excursion toward and shortly reaches its regulated maximum value. This zener voltage is applied across a voltage divider circuit generally constituted by resistors 67, 69, and a fixed fraction of the zener voltage appears at a gate 71 of a programmable unijunction transistor 73. A second voltage divider circuit generally constituted by heat sensitive resistor 23 and a variable resistor 75 determines a second voltage, less than the zener voltage, by way of a diode 77 to the upper terminal of a capacitor 79. The voltage on capacitor 79 can never exceed this second voltage divider value. As the voltage across zener diode 65 begins its positive excursion, capacitor 79 begins to charge by way of resistor 81 and temperature sensitive resistor 23. If and when the voltage across capacitor 79 exceeds the breakdown voltage for programmable unijunction transistor 73, as determined by the voltage divider potential on gate 71, the programmable unijunction transistor will conduct discharging the capacitor and inducing a pulse wave-form in a primary winding 83 of a pulse transformer T1. This pulse is fed back by way of pulse transformer T1 to the gate of another gate controlled full wave alternating current switch or triac 85 triggering that switch to its conductive state and shorting out autotransformer winding 39 of motor 27 through a closed loop generally constituted by the autotransformer winding and switches 53, 85. The shorted autotransformer winding 39 of motor 27 now becomes in effect, a generator, and the current tries to reverse its direction as a motor. As illustrated in FIG. 3a when the current goes thru current zero, switch 53 turns off and now blocks, and switch 85 then conducts until current zero is again attained through motor 27. With switch 53 blocking, switch 85 now parallels the time delay circuit of variable resistor 47 and capacitor 49 and, in effect, shorts the circuit. In this manner, capacitor 49 is prevented from recharging and turning switch 53 back on. At this time, switch 85 has effectively by-passed autotransformer winding 39 of motor 27 so that the motor now sees full line voltage on its run winding 37 and operates at its higher speed. Switches 53, 85 are bidirectional solid state control rectifiers for example, "triacs" which are full wave silicon switches designed to switch from a blocking state to a conducting state for either polarity of applied voltage with either positive or negative gate triggering. A diode 87 is in series with a secondary winding 89 of transformer T1 to prevent spurious control of the switch 85.

Figure 3B:
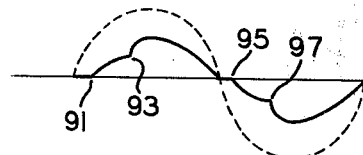
Figure 3C:
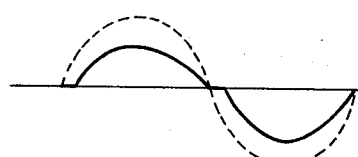

In each of FIGS. 3a, 3b and 3c, a reference or zero level of voltage or current is represented by a horizontal line, and for reference purposes, the voltage applied across line terminals 29, 31 is shown in dotted lines. The solid line wave forms are representative of total line current under different conditions and therefore different motor speeds. So long as triac 85 is non-conducting, motor 27 has the line voltage divided across run and autotransformer windings 37, 39 and is running in its slower speed mode as illustrated in FIG. 3a; however, when switch 85 is conducting, full line voltage is applied to the run winding, and the motor runs in its higher speed mode, as illustrated in FIG. 3c. Considering one half cycle of the line voltage, if triac 85 begins conducting very shortly after the beginning of that half cycle, motor 27 will receive nearly full energizing current; however, if the triac does not conduct until late in the half cycle, the motor will be receiving substantially less current, and its speed will closely approximate its low speed mode of operation. Variations in the time at which triac 85 first conducts therefore may be employed to continuously vary the speed of motor 27 between its high and low speed modes or values. For example, during the one cycle of line voltage depicted in FIG. 3b, triac 53 begins conducting at 91 shortly after the beginning of the positive excursion of line voltage, and for a period of time, the current flowing in motor 27 is substantially the same as that depicted in FIG. 3a. However, at point 93, triac 85 conducts, and the line current significantly increases due to the blocking or shunting of autotransformer winding 39, as previously discussed. Thereafter, the motor current behaves much as illustrated in FIG. 3c until that current returns to zero at the end of the positive half cycle. The negative half cycle behavior is precisely the same, except for polarity, with the beginning of conduction of triac 53 depicted at point 95 and conduction of triac 85 depicted at point 97. If triac 85 begins conducting earlier in the half cycle, points 93 and 97 move leftwardly and may eventually prohibit conduction of triac 53 whereas later conduction of triac 85 results in the points 93 and 97 occurring later in the cycle so that the current delivered to the motor would more nearly approximate that illustrated in FIG. 3a.

It was earlier assumed that the temperature of condenser coil 13 was relatively low and that motor 27 was being energized with its run and autotransformer windings 37, 39 in series all of the time. If the temperature of condenser coil 13 is now assumed to increase substantially, the resistance of temperature sensitive resistor 23 will decrease correspondingly thereby to raise the voltage divider potential at the cathode of the diode 77. This increases the full charge voltage for capacitor 79 and, of course, also diminishes the time constant for the capacitor circuit with any particular voltage value being reached sooner. Therefore, the breakdown voltage for programmable unijunction transistor 73 will be reached sooner as will be the pulse fed back for gating triac 85 for each cycle. Thus, triac 85 is conducting for a greater portion of each cycle to supply more energy to motor 27 thereby to increase its speed and the cooling effect of fan 25 as desired. Resistor 75 may be manually varied to initially set system 9 so that it operates generally at about a desired optimum temperature, and thereafter variations in resistor 75 should not be necessary. Similarly resistor 47 may be made variable so as to adjust the initial time delay between the beginning of a positive or negative half cycle and the beginning of conduction of the triac 53.

Since the entire control circuit is never subjected to a voltage greater than the voltage drop across winding 39 which may, for example, be around one half the line voltage, electrical components with lower voltage ratings, which are correspondingly less expensive, may be employed thus reducing the overall cost of the control circuit for motor 27 and the system. There is very little current flow through temperature sensitive resistor 23, and therefore, its accuracy is not impaired by any heating effects of a control current flowing therethrough. Rectifier 43 does not carry motor current and has the current flow therethrough limited by resistor 55 thus allowing the use of relatively low rating inexpensive diodes 57, 59, 61, 63 in rectifier 43.

Across triac 85, and therefore also in parallel with the series combination of triac 53 and winding 39 of motor 27, there may be provided a radio frequency interference supression circuit, such as for example, including a radio frequency choke 99 a pair of capacitors 101, 103, and a resistor 105 connected in parallel with capacitor 101.

From the foregoing it is now apparent that a novel control circuit and method for controlling speed of an electric motor and a novel refrigeration system have been presented meeting the objects and advantageous features set out hereintofore, as well as others. Further, it is comtemplated that variances in the precise manner of performing the method and that changes as to the arrangements, details and connections of the component parts of the control circuit and system, as well as the loads they are employed to enable, which have been presented to illustrate the invention, may be made by those having ordinary skill in the art without departing from the spirit or scope of the invention as set out in the claims which follow.

The following illustrates component values which may be employed for the electronic components of circuit 41.

| Component List | Values |
| --- | --- |
| 23 | 5K ohms at 25°C. |
| 47 | 0–150K ohms, 0.5 w. |
| 49 | 0.1 µf, 100 v. |

-continued

| Component List | Values |
| --- | --- |
| 53,85 | 200 v. |
| 55 | 10K ohms, 5 w. |
| 57,59,61,63,77,87 | 200 v., 0.75 amp. |
| 65 | 20 v., 1 w. |
| 66 | 82 ohms, 0.5 w. |
| 67, 69 | 3.3 ohms, 0.5 w. |
| 75 | 0–7.5K ohms, 0.5 w. |
| 79 | 0.1 $\mu$f, 25 v. |
| 81 | 150K ohms, 0.5 w. |
| 101 | 0.047 $\mu$f, 200 v. |
| 103 | 0.22 $\mu$f, 400 v. |
| R3 | 100 ohms, 0.5 w. |

What I claim as new and desire to secure by Letters Patent of the United States is:

1. A control circuit for controlling the speed of an alternating current motor having a plurality of windings adapted to be energized in different combinations comprising:
   a first gate controlled full wave alternating current switch coupled in series relations with a pair of the windings and adapted when conductive to effect energization of the motor in one operating speed mode thereof; and
   a second gate controlled full wave alternating current switch coupled in parallel relation with said first switch and one winding of the winding pair and in series relation with the other winding of the winding pair, said second switch being conductive upon the occurrence of preselected conditions for shorting said first switch and the one winding of the winding pair thereby to effect energization of the motor in another operating speed mode thereof.

2. A control circuit as set forth in claim 1 further comprising means for gating said first switch to its conductive state, said gating means being shorted when said second switch becomes conductive upon the occurrence of the preselected conditions.

3. A control circuit as set forth in claim 1 further comprising means responsive to the occurrence of the preselected conditions for gating said second switch to its conductive state.

4. A control circuit as set forth in claim 3 wherein said gating means comprises a phase control circuit responsive to the alternating current for providing signals having a controllable phase relationship with the alternating current source.

5. A control circuit as set forth in claim 4 further comprising means for coupling said phase control circuit to the gate of said second switch at the start of conduction of said second switch.

6. A Control circuit as set forth in claim 1 wherein said first switch and second switch are triacs.

7. A control circuit for controlling the speed of an alternating current motor having a plurality of windings to be selectively energized in different configurations to vary the speed of the motor comprising:
   a first gate controlled full-wave alternating current switch coupled in parallel with one of the windings and the parallel combination of said first switch and the one winding being connected in series with other motor windings, said first switch being conductive upon the occurrence of preselected conditions to energize the motor through the other windings to effect one speed operating mode thereof; and
   a second gate controlled full-wave alternating current switch coupled in series with the one winding and adapted when conductive to energize the motor through the one winding to effect another speed operating mode thereof, said second switch and the one winding being by-passed when said first switch is conductive.

8. A control circuit for varying the speed of an electric motor of the type having a plurality of windings selectively energizable in different configurations for operation of the motor at corresponding different speeds from a source of alternating current comprising:
   a phase control circuit responsive to the alternating current source for providing signals having a controllable phase relationship to the alternating current source;
   a first gate controlled full-wave alternating current switch coupled in parallel with one winding, the parallel combination of the one motor winding and switch being coupled in series with other motor windings whereby when said first switch is conducting substantially the full alternating current source voltage is applied to the said other motor windings; and
   means for coupling said phase control circuit to the gate of said first switch to control the start of conduction of said first switch.

9. A control circuit as set forth in claim 8 further comprising a second gate controlled full-wave alternating current switch in series with the one winding and adapted to be conductive for energizing the motor with the one winding in series with the other windings in the event that said first switch is nonconducting.

10. A control circuit as set forth in claim 9 further comprising means for enabling said second switch shortly after the beginning of each positive and negative half cycle of the alternating current.

11. A control circuit as set forth in claim 10 wherein said enabling means comprises a time delay circuit in series with the other windings, and a silicon unilateral switch coupled to said time delay circuit and the gate of said second switch.

12. A method of controlling the speed of an alternating current motor comprising the steps of:
   a. coupling a pair of gate controlled full-wave alternating current switches respectively in parallel and series relation with one of a plurality of windings of the motor and also coupling at least another winding thereof in series relation with one of the switches and the one winding; and
   b. controlling the duration of the conduction of the one switch in response to the occurrence of certain conditions and rendering the other of the switches respectively conductive and non-conductive when the one switch is respectively conductive and non-conductive.

13. A method of controlling the speed of an alternating current motor comprising the steps of:
   a. coupling a pair of gate controlled full-wave alternating current switches respectively in series and parallel relation with at least one winding of a plurality of windings of the motor and also coupling at least another winding thereof in series relation with one of the switches and the one winding;
   b. rendering the other of the switches conductive upon the occurrence of certain conditions to short out the one switch and the one winding for effecting operation of the motor in one speed mode; and c. rendering the one switch conductive for effecting operation of the motor in another speed mode when the other switch is non-conductive.

14. In a refrigerator system including a compressor, a condenser, an evaporator, and a fan for forcing air past said condenser to cool said condenser and aid in condensing the refrigerant; a control circuit for controlling the speed of said fan to thereby regulate the condenser temperature comprising an alternating current motor for driving said fan and having a plurality of windings selectively energizable in different configurations for operating said motor at corresponding different speeds; a phase control circuit including condenser temperature responsive means for providing temperature indicative control signals; rectifier means for providing said phase control circuit with a pulsating direct current; gate controlled full-wave alternating current switch means coupled in parallel with one of said windings to effectively by-pass that winding when said switch means is conducting in either direction; and means for coupling said phase control circuit to said switch means gate to control the duration of switch means conduction inversely according to the condenser temperature.

* * * * *